(12) United States Patent
Hamamoto

(10) Patent No.: US 9,668,321 B2
(45) Date of Patent: May 30, 2017

(54) SAFETY CHECKING APPARATUS, BEAM IRRADIATION SYSTEM, AND SAFETY CHECKING METHOD

(71) Applicant: MITSUBISHI HEAVY INDUSTRIES, LTD., Tokyo (JP)

(72) Inventor: Koichi Hamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 76 days.

(21) Appl. No.: 14/723,744

(22) Filed: May 28, 2015

(65) Prior Publication Data

US 2016/0025560 A1    Jan. 28, 2016

(30) Foreign Application Priority Data

Jul. 24, 2014 (JP) .................. 2014-150533

(51) Int. Cl.
  *G01J 1/32*   (2006.01)
  *H05B 37/02*  (2006.01)
  *G01S 7/497*  (2006.01)
  *G01S 7/48*   (2006.01)

(52) U.S. Cl.
  CPC .......... *H05B 37/0227* (2013.01); *G01S 7/497* (2013.01); *G01S 7/4804* (2013.01)

(58) Field of Classification Search
  CPC .................................................. H05B 37/0227
  USPC .......................................................... 250/205
  See application file for complete search history.

(56) References Cited

U.S. PATENT DOCUMENTS

| 3,801,825 A | * | 4/1974 | Schwartz | G02F 1/37 250/206 |
| 8,290,208 B2 | * | 10/2012 | Kurtz | G06K 9/00228 382/103 |
| 2005/0128578 A1 | * | 6/2005 | Sugawara | H04N 5/74 359/443 |
| 2013/0194093 A1 | * | 8/2013 | Rakijas | G08B 27/006 340/539.13 |

FOREIGN PATENT DOCUMENTS

| JP | 8-29533 | 2/1996 |
| JP | 2002-6397 | 1/2002 |
| JP | 2003-154989 | 5/2003 |

* cited by examiner

*Primary Examiner* — Thanh Luu
(74) *Attorney, Agent, or Firm* — Wenderoth, Lind & Ponack, L.L.P.

(57) ABSTRACT

A safety checking apparatus is provided with a determining section and a result data control section. The determining section determines a safety level of an asset to an incident beam according to an irradiation beam based on the irradiation direction of the irradiation beam and a position or area of the asset. The result data control section carries out a notification to the asset according to the safety level determined by the determining section. Thus, the safety level is determined to a person and a thing one in a region out of a path of the beam.

18 Claims, 13 Drawing Sheets

| ASSET | PRESENT IN DANGEROUS REGION? | SCATTERED BEAM: ENTER BRITTLE REGION? | DETERMINATION RESULT |
|---|---|---|---|
| 3-1 | ○ | DETERMINATION: UNNECESSARY | DANGEROUS |
| 3-2 | × | ○ | SAFETY LEVEL ACCORDING TO INCIDENT BEAM |
| 3-3 | × | × | SAFETY |
| 3-4 | IN SAFETY REGION | DETERMINATION: UNNECESSARY | SAFETY |

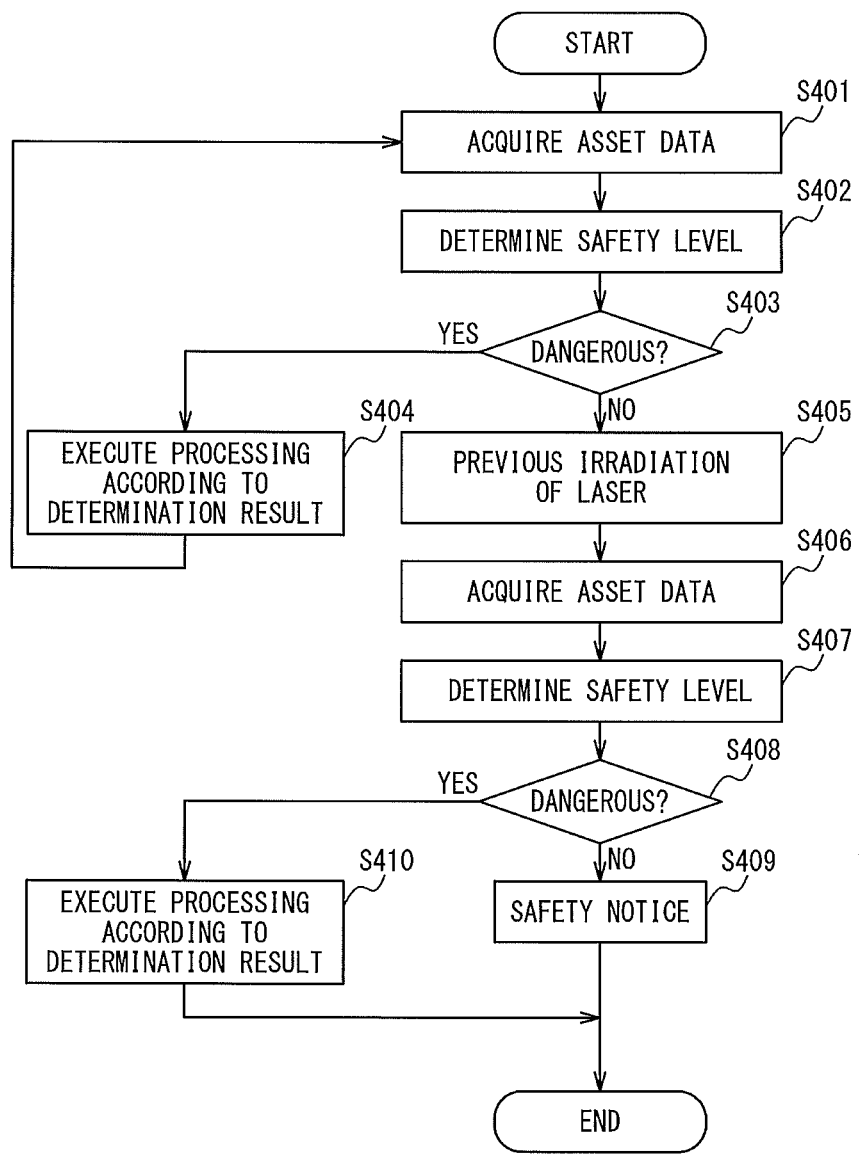

SAFETY CHECKING APPARATUS, BEAM IRRADIATION SYSTEM, AND SAFETY CHECKING METHOD

CROSS-REFERENCE

This application is based on Japanese Patent Application No. JP 2014-150533, and claims the priority based on it. The disclosure thereof is incorporated herein by reference.

TECHNICAL FIELD

The present invention relates to a safety checking apparatus, a beam irradiation system, and a safety checking method, and more particularly, to a safety checking apparatus, a beam irradiation system and a safety checking method, which check a safety for a scattered beam due to an irradiation beam.

BACKGROUND ART

To prevent an irradiation beam from being incident to eyes directly or indirectly in case of using a high power light source, various safety measures are taken. For example, when the high power light source is used in a closed space such as a laboratory and a factory, a controlled area in which entrance is limited is provided to secure the safety.

In such a case, it is easy to distinguish the controlled area from the safety area in the closed space. However, in a non-closed space like outdoors, there is a case that it is difficult to set the controlled area. For example, when a long-range communication using a laser beam and a laser ranging are carried out, it is difficult to provide the controlled area between the light source and the irradiation object. Therefore, a technique of securing a safety without providing the controlled area is required even in the situation that the high power light source is used in the non-closed space.

For example, JP 2003-154989A (Patent Literature 1) discloses a laser passage display apparatus having a safeguard by which the irradiation of a laser beam is stopped when a ship invades between a light transmitting buoy and a target buoy. In Patent Literature 1, by detecting an inclination of the light transmitting buoy and the orientation of the target buoy, the target buoy is tracked and the irradiation of the laser beam is stopped in case of the tracking being impossible.

Also, JP H08-29533A (Patent Literature 2) discloses a laser radar that measures a reflected laser beam level and irradiates a laser beam with a safety level for the eyes. The laser radar in Patent Literature 2 calculates a strength level of the laser beam which can be irradiated, according to a distance to an object that is measured by a low power laser beam, and irradiates the laser beam with the calculated strength level. Thus, a long laser ranging becomes possible while securing the safety for a person on a light path.

Moreover, JP 2002-6397A (Patent Literature 3) discloses an image display unit that can prevent that the light projected to a screen is erroneously incident directly to the eyes. In Patent Literature 3, an object in neighborhood of a projection lens is sensed by a photo-coupler and the output of the projection light is controlled according to the sensing of the object. Thus, the display is controlled to a whole black display. Accordingly, it can be prevented that the projection light is incident to the eyes of the human being.

For example, in case of a laser beam of a low energy density, it is enough to secure a safety on a light path. However, in case of a laser beam of a high energy density, there is a case that a reflected laser beam and a scattered laser beam exert harm on persons and electronic circuits. Even in such a case, the safety needs to be secured to the persons in a region except for a region on the light path. In case of using a high power light source, the similar measures need to be performed. However, in the above-mentioned conventional examples, the safety to the human bodies on the light path can be secured but the safety of the objects and the human bodies in a region out of the light path cannot be secured.

CITED LIST

[Patent Literature 1] JP 2003-154989A
[Patent Literature 2] JP H08-29533A
[Patent Literature 3] JP 2002-6397A

SUMMARY OF THE INVENTION

Therefore, an object of the present invention is to provide a safety checking apparatus, a beam irradiation system, and a safety checking method, in which a safety of persons and objects in the region out of a light path of an irradiation beam can be secured.

A safety checking apparatus of the present invention includes: a determining section configured to determine a safety level of an asset for an incident beam related to an irradiation beam based on a position or area of the asset and an irradiation direction of the irradiation beam; and a result data control section configured to transmit a notice to the asset based on a determination result of the safety level by the determining section.

Here, the determining section may determine the safety level for the incident beam to the asset based on a weak region of the asset, the irradiation direction of the irradiation beam and the position or area of the asset.

Also, the determining section may determine the safety level of the asset by comparing an energy density of the incident beam to the asset and a reference energy density registered as a determination condition. In this case, the determining section may determine the energy density of the incident beam based on the position or area of the asset, the irradiation direction of the irradiation beam, and an output power of the irradiation beam.

Otherwise, the determining section may calculate the energy density of the incident beam to the asset based on the position or area of the asset, the irradiation direction of the irradiation beam, a weak region of the asset, and an output power of the irradiation beam, and determine the safety level of the asset based on the comparison result of the calculated energy density and the reference energy density registered as the determination condition.

Or, the determining section may measure an energy density of an incident beam to the asset, related to a test irradiation beam irradiated previously to the irradiation beam, and determine the safety level of the asset based on a comparison result of the measured energy density and the reference energy density registered as the determination condition.

Instead, the determining section may determine the safety level of the asset for the incident beam to the asset based on the weak region of the asset set based on a weak part of the asset, a dangerous region set based on the output power of the irradiation beam and the irradiation direction of the irradiation beam. In this case, the determining section may determine the asset to be dangerous, when the weak region of the asset and the dangerous region overlap each other.

A beam irradiation system of the present invention includes: a beam irradiation apparatus configured to irradiate an irradiation beam; and a safety checking apparatus which includes: a determining section configured to determine a safety level of an asset for an incident beam related to the irradiation beam based on a position or area of the asset and an irradiation direction of the irradiation beam, and a result data control section configured to transmit a notice to the asset based on a determination result of the safety level by the determining section.

Here, the safety checking apparatus may output a control signal to the beam irradiation apparatus to change properties of the irradiation beam, when determining the asset to be dangerous as the safety level of the asset for the incident beam to the asset, and the beam irradiation apparatus may change the properties of the irradiation beam in response to the control signal. Or, the safety checking apparatus may output a control signal to the beam irradiation apparatus to stop the irradiation of the irradiation beam, when determining the asset to be dangerous as the safety level of the asset for the incident beam to the asset, and the beam irradiation apparatus may stop the irradiation of the irradiation beam in response to the control signal.

A safety checking method of the present invention includes: determining a safety level of an asset for an incident beam related to an irradiation beam based on a position or area of the asset and an irradiation direction of the irradiation beam; and transmitting a notice to the asset based on a determination result of the safety level.

Here, the determining may include determining the safety level to the incident beam to a weak region of the asset, the irradiation direction of the irradiation beam and the position or area of the asset. Or, the determining may include determining the safety level of the asset based on a comparison result an energy density to the incident beam to the asset and a reference energy density registered as a determination condition. In this case, the determining may include determining the energy density of the incident beam based on the position or area of the asset, the irradiation direction of the irradiation beam, and an output power of the irradiation beam.

Otherwise, the determining includes: calculating the energy density of the incident beam to the asset based on the position or area of the asset, the irradiation direction of the irradiation beam, a weak region of the asset, and an output power of the irradiation beam; and determining the safety level of the asset based on the comparison result of the calculated energy density and the reference energy density registered as the determination condition. Instead, the determining may include: measuring an energy density of an incident beam to the asset, related to a test irradiation beam irradiated previously to the irradiation beam; and determining the safety level of the asset based on a comparison result of the measured energy density and the reference energy density registered as the determination condition.

Also, the determining includes determining the safety level of the asset for the incident beam to the asset based on the weak region of the asset set based on a weak part of the asset, a dangerous region set based on the output power of the irradiation beam, and the irradiation direction of the irradiation beam. Or, the determining may include determining the asset to be dangerous, when the weak region of the asset and the dangerous region overlap each other.

Also, a non-transitory computer-readable storage medium stores a safety checking program, by executing by a computer, to realize functions of: determining a safety level of an asset for an incident beam related to an irradiation beam based on a position or area of the asset and an irradiation direction of the irradiation beam; and transmitting a notice to the asset based on a determination result of the safety level.

According to the present invention, a safety to the persons and the objects in the region out of the light path of the irradiation beam can be secured.

BRIEF DESCRIPTION OF THE DRAWINGS

FIG. 15 is a flow diagram showing an example of the safety determination operation of the fourth embodiment.

DESCRIPTION OF EMBODIMENTS

Figure 1:
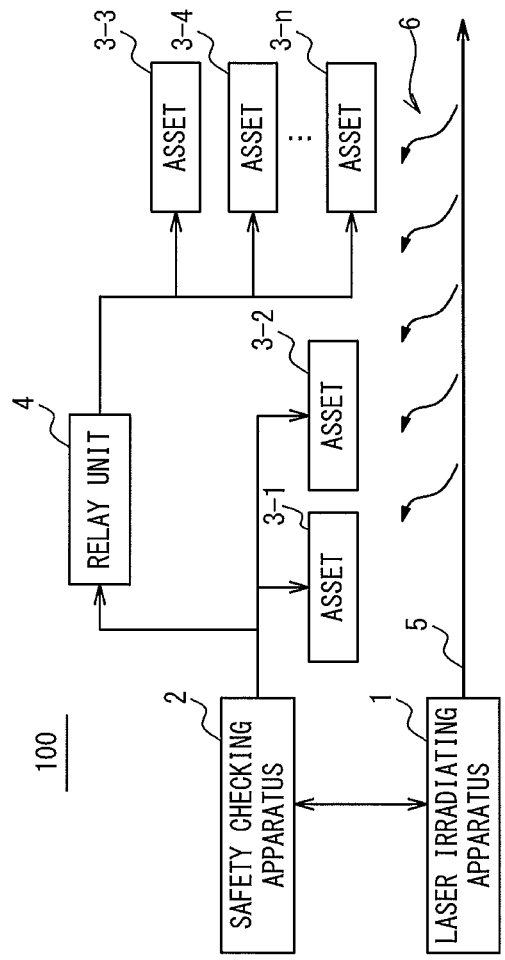
FIG. 1 is a diagram showing an example of a configuration of a beam irradiation system according to the present invention.

A safety checking apparatus according to the present invention determines the safety of objects based on the positions of the objects (hereinafter, to be referred to as assets) to be protected from beams such as a laser beam, a scattered laser beam and a reflected laser beam.

The safety of the asset is determined based on whether or not an energy density of an incident beam in a position or area of the asset exceeds a threshold value set to the asset. The safety of the asset may be determined based on a relation among the position or area of the asset, an orientation of the asset, and the incident beam, in addition to the above. The safety of the asset in the position or area of the asset is determined according to the measurement result when the energy density of the beam in a previous irradiation is measured in the position or area.

The safety checking apparatus of the present invention can notify a safety level and a movement command to the asset based on the determination result of the safety. In addition, the safety checking apparatus of the present invention can control a light source and change the properties of the irradiated beam (e.g. an output power, a wavelength, an irradiation direction) or permission or non-permission of irradiation based on the determination result of the safety.

Hereinafter, the embodiments of the present invention will be described with reference to the attached drawings. Identical or similar reference numerals in the drawing indicate identical or similar components. In the following description, to distinguish components with a same reference numeral, an additional number is added, and when the components are collectively referred, the description is made with no additional number.

(Configuration)

Figure 2:
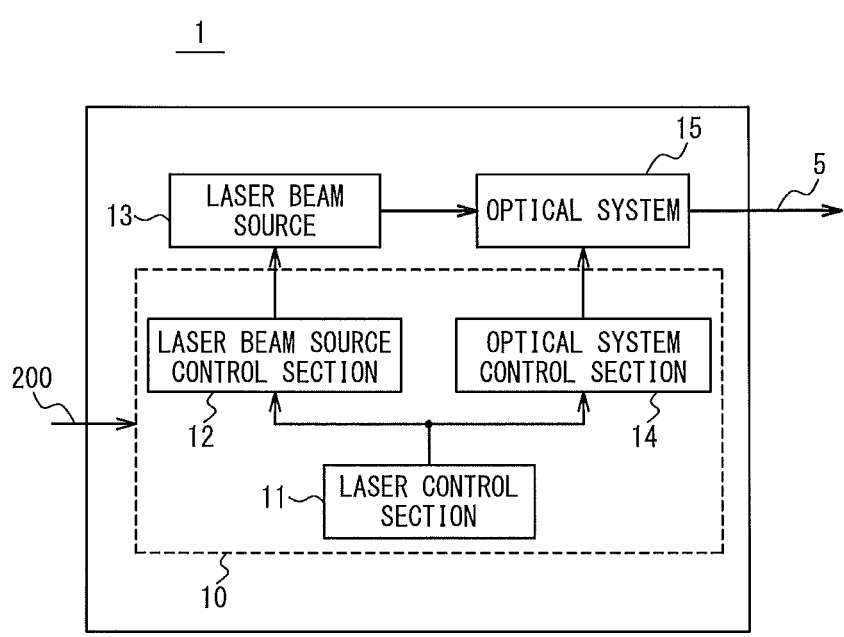
FIG. 2 is a diagram showing an example of a configuration of a beam irradiation apparatus according to the present invention.
Figure 3:
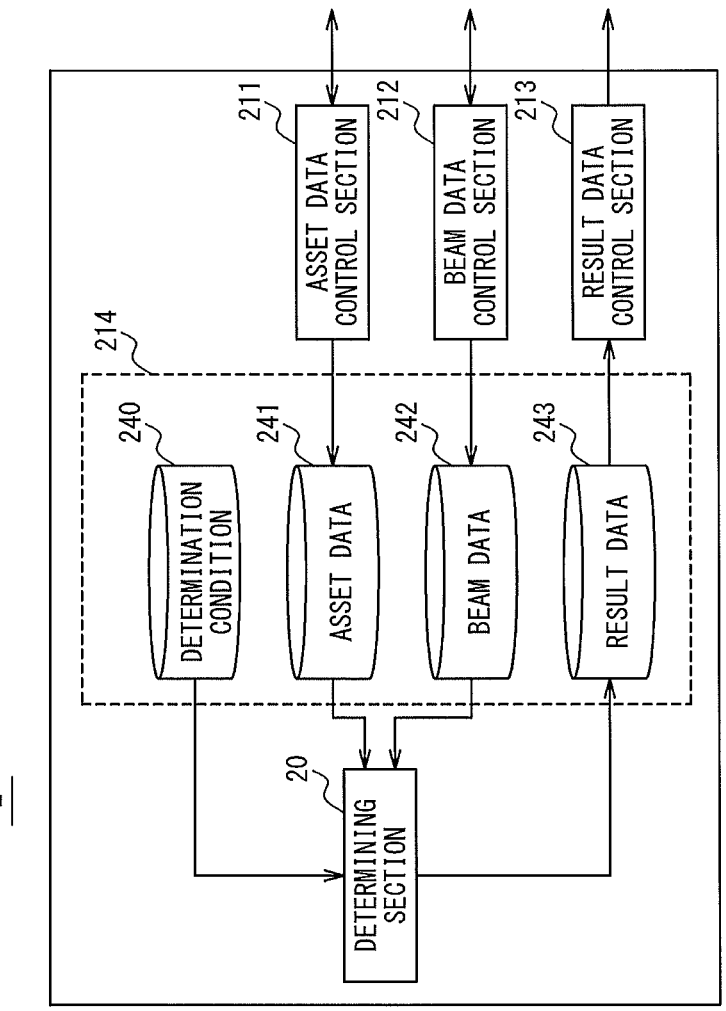
FIG. 3 is a diagram showing an example of a configuration of a safety checking apparatus according to the present invention.

Below, a beam irradiation system of the present invention will be described by using as an example, a laser beam irradiation system. Referring to FIG. 1 to FIG. 3, FIG. 1 is a diagram showing an example of the configuration of the beam irradiation system 100 according to the present invention, FIG. 2 is a diagram showing an example of the configuration of the beam irradiation apparatus 1 according to the present invention, and FIG. 3 is a diagram showing an example of the configuration of a safety checking apparatus 2 according to the present invention.

Referring to FIG. 1, the beam irradiation system 100 of the present invention is provided with the beam irradiation apparatus 1, the safety checking apparatus 2, a plurality of assets 3-1 to 3-n and a relay unit 4. The beam irradiation apparatus 1 irradiates a beam such as a laser beam 5 to an open field (e.g. an outdoor field). For example, the laser beam 5 has a high power of the class 4 laser in Japanese Industrial Standards C6802 "Safety of laser products" (for example, a level which exceeds 0.5 W to a 1064 nm, CW laser). That is, a scattered laser beam and reflected laser beam of the laser beam 5 are dangerous in addition to the direct laser beam. The safety checking apparatus 2 determines the safety of the asset 3 according to the position or area of the asset 3. The safety checking apparatus 2 carries out processing (for example, a notification of the determination result to the asset 3 and a change of the properties of the laser beam) based on the determination result of the safety. Each of the assets 3-1 to 3-n represents an object to be protected from the laser beam 5, the scattered laser beam and the reflected laser beam (which are hereinafter referred to as an incident laser beam 6). The asset 3 represents a person, an electronic equipment unit or a moving vehicle loaded with the person and the electronic equipment (e.g. a vehicle, a ship, an airplane, and a spacecraft). The safety checking apparatus 2 is connected with the assets 3 by a wire or radio communication line. When the asset 3 is a person, it is desirable that the asset (person) 3 carries a communication device communicable with the safety checking apparatus 2. In an example shown in FIG. 1, the assets 3-1 and 3-2 are in the neighborhood of the safety checking apparatus 2, and the assets 3-3 to 3-n are in distant places from the safety checking apparatus 2. In this case, the safety checking apparatus 2 and the assets 3-3 to 3-n in the distant places are connected by a communication line through the relay unit 4. The relay unit 4 is exemplified by a router on a network and a communication satellite, and is a communication device appropriately selected according to a communication line built between the safety checking apparatus 2 and the assets 3.

Referring to FIG. 2, the details of the configuration of beam irradiation apparatus 1 will be described. The beam irradiation apparatus 1 is provided with a laser control unit 10, a light source 13, and an optical system 15. The laser control unit 10 is provided with a laser control section 11, a light source control section 12, and an optical system control section 14. The laser control unit 10 controls the light source 13 and the optical system 15 with respect to permission or non-permission of irradiation of the laser beam 5, and sets and changes properties of the laser beam 5. The laser control unit 10 may control the permission or non-permission of irradiation of the laser beam 5 and carry out the setting and changing of the properties of the laser beam in response to a control signal 200 from the safety checking apparatus 2.

The laser control section 11 sets the properties of the laser beam such as an output power, a wavelength, a pulse width, and a modulation method 5, to the light source control section 12, and sets the properties of the laser beam 5 such as an irradiation direction and a focusing of light, to the optical system control section 14. Also, the laser control section 11 instructs the start and stop of irradiation of the laser beam 5 to the light source control section 12 and the optical system control section 14. It is desirable that the laser control section 11 sets the properties of the laser beam 5 in response to an instruction from an upper-layer system (not shown) and controls the irradiation of the laser beam 5, the stop of the irradiation, and the change of the properties of the laser beam 5. For example, when an irradiation object, an irradiation time, and the number of times of irradiation are instructed from the upper-layer system, the laser control section 11 determines the irradiation direction of the laser beam 5 from the irradiation object position or area and instructs the light source control section 12 and the optical system control section 14 to irradiate the laser beam 5 at the irradiation time. Or, the laser control section 11 may control the change of the properties of the laser beam 5 (e.g. the output power, the irradiation direction, the wavelength, the pulse width, the number of times of irradiation, and the irradiation interval) and the stop of the laser irradiation in response to the control signal 200 from the safety checking apparatus 2.

The light source control section 12 controls the light source 13 according to the properties, such as the output power, the wavelength, and the pulse width, which are instructed from the laser control section 11, to generate the laser beam 5. The optical system control section 14 controls the optical system 15 to output the laser beam 5 to the irradiation direction instructed from the laser control section 11. The light source control section 12 and the optical system control section 14 may control the change of the properties (e.g. the output power, the wavelength, the irradiation direction and so on) and the irradiation stop in response to the control signal 200 from the safety checking apparatus 2.

The light source 13 converts energy supplied from energy sources into optical energy, and oscillates to generate the laser beam 5. The generation principle of the laser beam 5 in the light source 13 can be optionally selected. For example, high power lasers such as a chemical laser, a free electron laser, a solid-state laser and a fiber laser can be used appropriately. Also, the lasers of a plurality of irradiation methods may be combined and loaded as the light source 13. The optical system 15 controls the laser beam 5 to a desired direction by a mirror and a focusing lens whose are controlled by the optical system control section 14.

According to the present invention, the influence of the scattered laser beam and the reflected laser beam on the asset 3 can be excluded. Therefore, the light source which outputs the laser beam 5 in the laser class 4 equal to or more than 0.5 W can be used as the light source 13. Also, in the present invention, the influence of the scattered laser beam and the reflected laser beam from the line-of-sight direction of the asset 3 can be excluded. Therefore, a light source of a visible laser beam or an infrared laser beam which have a large influence on the eyes of a person can be used for the light source 13. In other words, the light source having the high power (equal to or more than 0.5 W) of the visible laser beam or the infrared laser beam can be used as the light source 13 according to the present invention. Note that in the present embodiment, the beam irradiation apparatus 1 which irradiates the laser beam 5 will be described as an example. In addition to this, the present invention can be applied to a beam irradiation apparatus which irradiates a beam having an influence on a human body, an electronic equipment unit and so on, by the reflected beam and scattered beam of the beam.

Referring to FIG. 3, the safety checking apparatus 2 is exemplified by a computer apparatus, and is provided with a determining section 20, an asset data control section 211, a beam data control section 212, a result data control section 213 and a storage unit 214. It is desirable that the determining section 20, the asset data control section 211, the beam data control section 212 and the result data control section 213 are realized by making a CPU (not shown) execute a program recorded in the storage unit 214 (to be also referred to as a recording medium). Or, the functions of the determining section 20, the asset data control section 211, the beam data control section 212 and the result data control section 213 may be realized in hardware only, or in cooperation of hardware and software. Determination condition 240, asset data 241, beam data 242 and result data 243 are recorded in the storage unit 214.

The determining section 20 determines the safety of the asset 3 based on the determination condition 240, the asset data 241, and the beam data 242 and outputs the determination result as the result data 243. The details of the determination condition 240 will be described later. The condition for determining the safety of the asset 3 is registered as the determination condition 240 based on the position or area of the asset 3. The determination condition 240 may be previously registered on the storage unit 214 and may be generated according to an analysis result calculated at the time of the safety determination. The details of the asset data 241 will be described later. Data showing the position or area of the asset 3, a weak part of the asset 3, an energy density of an incident laser beam 6 in the position or area of the asset 3, and so on are registered as the asset data 241. The asset data 241 may be previously registered on the storage unit 214 and may be acquired from the asset 3 at the time of the safety determination. The beam data 242 contains the properties of the laser beam 5 (e.g. the output power, the wavelength, the modulation method, the irradiation direction, the irradiation direction, and so on). The beam data 242 may be previously registered on the storage unit 214 and may be acquired from the beam irradiation apparatus 1 previously to the safety determination.

The asset data control section 211 acquires the asset data 241 from an external unit. For example, the external unit is another asset 3, another computer apparatus (not shown), or an input device (not shown) exemplified by a user interface. The asset data 241 may be transmitted from the external unit in response to an acquisition signal from the asset data control section 211 and may be transmitted from the external unit voluntarily without the acquisition signal.

The beam data control section 212 acquires the beam data 242 from an external unit. For example, the external unit is the beam irradiation apparatus 1, another computer apparatus (not shown), or an input device (not shown) exemplified by a user interface. The beam data 242 may be transmitted from the external unit in response to an acquisition signal from the beam data control section 212 and may be transmitted voluntarily from the external unit without receiving the acquisition signal.

The result data 243 contains data showing the determination result of the safety determination by the determining section 20. Or, the result data 243 contains data of controlling an operation according to the determination result. For example, the determination result of the safety which has been classified into one of a plurality of levels from a "safe" level of the highest safety level to a "dangerous" level of the lowest safety level is recorded or outputted as the result data 243 in relation to the asset 3 as a determination object. The levels of the safety may contain only 2 levels of the "safe" level and the "dangerous" level. Also, the data for controlling the beam irradiation apparatus 1 is recorded or outputted as the result data 243 which is used to control an operation of the beam irradiation apparatus 1 according to the determination result. Specifically, laser control data such as the change of the properties of the laser beam 5 (e.g. the output power, the wavelength, the modulation method, the irradiation direction, the irradiation focus, and so on), and the instruction of the stop of irradiation, is recorded or outputted as the result data 243. Or, control data or notice data for moving the asset 3 as the result data 243 used to control the movement according to the determination result are recorded and outputted. Specifically, data for notifying, broadcasting, or outputting in sound (e.g. loudspeaker), the determination result or a warning according to the determination result, and so on may be recorded and outputted as the result data 243.

The result data control section 213 notifies the result data 243 to the assets 3. Or, the result data control unit 213 operates based on the result data 243. For example, the result data control section 213 controls the beam irradiation apparatus 1 based on the result data 243 and controls the change of the properties of the laser beam 5 or the irradiation stop. Or, the result data control section 213 instructs the asset 3 to move to a safety region based on the result data 243. Or, the result data control section 213 notifies, broadcast, or outputs in sound, the warning based on the result data 243.

Referring to FIG. 1, the assets 3 show objects of the safety determination or objects to be protected from damage due to the laser beam 5, and are such as persons, electronic equipments, and vehicles. When the asset 3 is the person, it is desirable that the asset 3 wears or carries a unit which detects a region along the line-of-sight direction as a weak region to notify to the safety checking apparatus 2. For example, a goggle or a helmet loaded with a sensor for detecting the line-of-sight direction can be used as the unit for detecting the line-of-sight direction. Or, it is desirable that the asset 3 is provided with or carries an equipment unit with an acceleration sensor or a velocity sensor to detect the direction of the movement of the asset 3 as the line-of-sight direction. Also, it is desirable that the asset 3 is provided with or carries a unit for detecting the position or area of the asset 3 to notify the detection result to the safety checking apparatus 2. For example, for the function to detect the position or area, a position coordinates detection apparatus using GPS can be used appropriately. Or, if the data indicative of the position or area of the asset 3 (for example, data showing indoors or data showing a predetermined room) can be registered, the registration data can be used as the position data. Moreover, the position or area of the asset 3 and the line-of-sight direction (for example, an orientation of a part detected as a face) may be detected from video data and scan data imaged by an external unit such as a camera.

Also, when the asset 3 is exemplified by a moving vehicle with a boarding person such as an aircraft, a ship, and a vehicle, it is desirable that a direction of movement of the asset 3 is used as the line-of-sight direction. In this case, the direction of the movement of the asset 3 and the position data of the asset 3 may be detected by a radar provided outside the asset 3, or may be detected by GPS or a transponder attached to the asset 3.

Moreover, when the asset 3 is a moving vehicle loaded with an electronic equipment unit, such as a satellite and an unmanned aircraft, a region corresponding to the orientation of a weak part of the electronic equipment in relation to the incident beam 6 can be detected as a weak region. Note that the region corresponding to the weak part of the electronic equipment held by the asset 3 may be used as the weak region regardless of whether the person boards on the asset.

The asset 3 may have a configuration for protecting the weak part. For example, the naked eyes are weak to an incident beam, but the weakness to the incident beam decreases by using light shielding goggles. When the asset 3 is not the person, the weakness to the incident beam can be decreased by using a light shielding plate or an electromagnetic shield plate.

The asset 3 transmits the detected position data and asset identification data for identifying itself to the safety checking apparatus 2 as the asset data 241. At that time, it is desirable that the asset 3 transmits the direction from which weakness is detected, to the safety checking apparatus 2 as the asset data 241. The asset 3 may transmit the asset data 241 in response to an instruction from the safety checking apparatus 2 and may transmit it voluntarily.

By the above-mentioned configuration, the safety checking apparatus 2 according to the present invention determines the safety of each of the assets 3 according to the asset data and the properties of the laser beam 5, and can call an attention to the asset 3, and carries out the change of the properties of the laser beam 5 and compulsory stop of irradiation of the laser beam, according to the determination result. In this case, the safety checking apparatus 2 may calculate an existing area of the asset 3 from the position of the asset 3.

Next, the details of the safety determination operation in the present invention will be described.

[First Embodiment]

Figure 4:
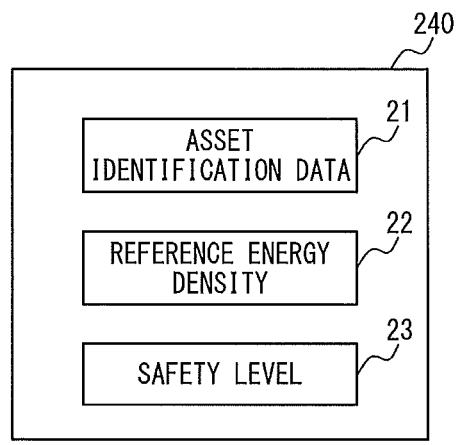
FIG. 4 is a diagram showing an example of a determination condition in a first embodiment.
Figure 5:
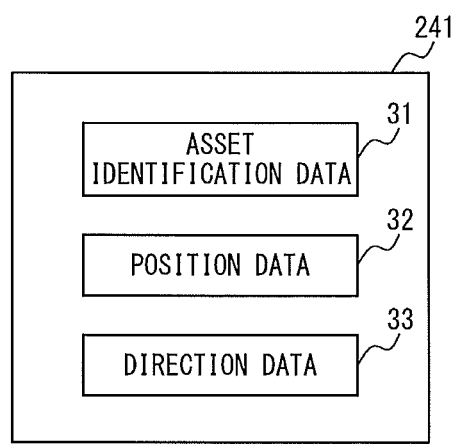
FIG. 5 is a diagram showing an example of asset data in the first embodiment.
Figure 6:
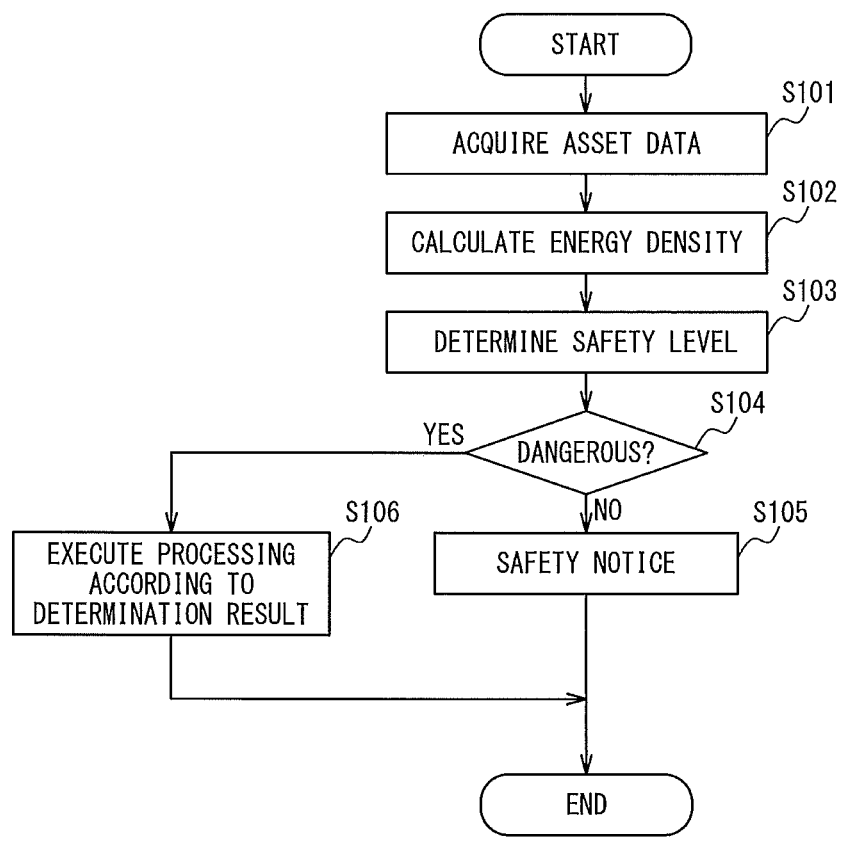
FIG. 6 is a flow diagram showing an example of an operation of safety determination in the first embodiment.

Referring to FIG. 4 to FIG. 6, the operation of the beam irradiation system 100 according to a first embodiment will be described. FIG. 4 is a diagram showing an example of the determination condition 240 in the first embodiment. FIG. 5 is a diagram showing an example of the asset data 241 in the first embodiment. FIG. 6 is a flow diagram showing an example of the operation of the safety determination in the first embodiment. In the first embodiment, the safety of the asset 3 is determined based on whether or not the energy density of an incident laser beam 6 in the position or area of the asset 3 exceeds a threshold value set to the asset 3.

Referring to FIG. 4, the determination condition 240 in the first embodiment is provided with asset identification data 21, a reference energy density 22, and a safety level 23, which are related to each other. It is desirable that the asset identification data 21 contains data showing a kind of the asset 3. For example, the data showing either a person, a vehicle, an aircraft, a ship, a satellite or electronic equipment is desirably contained as the kind of the asset 3 in the asset identification data 21. Also, the asset identification data 21 may contain an identifier allocated for every asset 3. In this case, it is desirable that the kind of asset 3 can be specified based on the identifier. An identifier allocated peculiarly to each of the person, the vehicle, the aircraft, and the satellite, and a production number of the equipment may be used appropriately as the identifier registered as the asset identification data 21.

The reference energy density 22 is a criterion of the safety level of the asset 3 which is specified by the asset identification data 21. In detail, a condition of a harmless energy density or dangerous energy density to the asset 3 according to the kind of asset 3 is set as a reference energy density 22. In this case, when the safety level 23 is one of a plurality of levels from the "safe" level of the highest safety level to the "dangerous" level of the lowest safety level, it is desirable that ranges or boundary conditions of energy densities corresponding to the plurality of safety levels 23 are set as the reference energy densities 22 corresponding to the safety levels 23. For example, when the safety level 23 is one of three levels of the "safe" level, the "caution" level, and the "dangerous" level, either of a reference energy density which is safe to the asset 3, a reference energy density which needs to be cautious, and a reference energy density which is dangerous to the asset 3 is set as the reference energy density 22 corresponding to the safety level 23. Or, the boundary condition of the energy density to determine each of the "safe" level, the "caution" level, the "dangerous" level may be set as the reference energy density 22. Also, when the asset 3 is provided with a configuration to protect a weak part of the asset, the reference energy density 22 (determination condition) when the safety level 23 is in the "safe" level is set to a value which is higher than a typical value.

Referring to FIG. 5, the asset data 241 in the first embodiment is provided with asset identification data 31, position data 32, and direction data 33, which are related to each other. The asset identification data 31 contains data similar to the data contained in the asset identification data 21. For example, it is desirable that the asset identification data 31 contains the kind of asset 3 or the identifier for specifying the asset 3. Note that the asset identification data 31 may contain data showing whether or not the asset 3 is provided with a configuration for protecting a weak part, in addition to the data for specifying the asset 3. The position data 32 contains data for specifying the position or area of the asset 3. For example, the position data 32 contains data for specifying the coordinates of the asset 3 and a predetermined area. Or, the position data 32 may contain a name of a place where the asset 3 is located (e.g. a room name). The direction data 33 contains data for specifying a weak part of the asset 3. For example, when the asset 3 is a person, the direction data 33 contains the line-of-sight direction or a region corresponding to the line-of-sight direction. Or, when the asset 3 is a moving vehicle boarded with the person, the direction data 33 contains the direction of the movement of the asset 3. Or, when the asset 3 is provided with a configuration loaded with an electronic equipment, the direction data 33 contains an orientation of the weak part of the asset 3 to the incident beam 6 (for example, the direction of a normal line to the surface which covers the weak part). Note that the weak region may be along one direction, but the weak region may include a plurality of directions in a range defined by an angle of view and an angle of elevation with respect to a predetermined direction as a reference direction. For example, a range of view or a region corresponding to a direction in the range of view with respect to the line-of-sight direction may be set as the weak region (direction data 33). As a specific instance, in case of an optical camera, a region corresponding to a direction of the aperture or a view angle may be defined as the weak region.

The determining section 20 in the first embodiment specifies the kind of asset 3 and the position or area of the asset 3 from the asset data 241 and calculates the energy density of the incident beam 6 to the asset 3 in the specified position or area. Also, the determining section 20 refers to the determination condition 240 to specify the reference energy density 22 according to the specified kind of the asset 3, and determines the safety level 23 of the asset 3 based on the reference energy density 22 and a calculation value of energy density of the incident beam 6.

Referring to FIG. 6, the details of the safety determination operation in the first embodiment will be described. The safety checking apparatus 2 acquires the asset data 241 of the asset 3 (step S101). For example, the safety checking apparatus 2 acquires the position data 32 of the asset 3 from the asset 3 or an external unit (not shown). In this case, when the position data 32 of the asset 3 is acquired in response to an instruction from the safety checking apparatus 2, the asset 3 and the external unit (not shown) do not need to transmit the asset identification data 31 because the asset 3 as an acquisition object is specified. On the other hand, when the position data 32 is voluntarily transmitted from the asset 3 or the external unit (not shown), it is desirable that the asset 3 or the external unit (not shown) transmits the asset identification data 31 of the asset 3 to the safety checking apparatus 2. Also, it is desirable that the safety checking apparatus 2 acquires the direction data 33 in addition to the position data 32 at the step S101.

The safety checking apparatus 2 calculates the energy density of the incident beam 6 in the position or area of the asset 3, by using the acquired asset data 241 (step S102). In detail, the safety checking apparatus 2 specifies the properties of the laser beam 5 to be irradiated, from the beam data 242 (e.g. the output power, the wavelength, the modulation method, the irradiation direction, the irradiation focus, and so on) and specifies the position or area of the asset and the weak part of the asset from the asset data 241. The safety checking apparatus 2 calculates the energy density of the scattered laser beam or the reflected laser beam from the laser beam 5 in the position or area of the asset based on the specified irradiation properties. At this time, it is desirable that the energy density is calculated under the consideration of the positions and sizes of buildings and landform which generate the reflected laser beam, and the state of the atmosphere which generates the scattered laser beam. Also, when the direction data 33 is contained in the asset data 241, it is desirable that the energy density in the weak region is calculated. For example, when the energy density of the incident beam 6 is calculated around the asset 3, a necessary calculation cost is enormous. On the other hand, by calculating the energy density of the incident beam 6 in only the weak region, the calculation cost can be reduced and the energy density in the region necessary and indispensable for the safety determination can be calculated. Therefore, when the direction data 33 can be acquired, it is desirable that the safety checking apparatus 2 calculates the energy density of the incident beam 6 in only the weak region.

Next, the safety checking apparatus 2 refers to the determination condition 240 to carry out the safety determination based on the calculated energy density (step S103). In this step, the safety level 23 is determined as the safety level of the asset 3 based on the reference energy density 22 and the calculation value of the energy density. At step S102, when the energy density over the whole area of the asset 3 is calculated, the safety levels to all the directions may be determined, but it is desirable that the safety level for the highest one of the calculation values of the energy density is determined. Or, at step S102, when the energy density in the weak part of the asset 3 is calculated, it is desirable that the safety level for the energy density in the weak part is determined. Moreover, when the asset 3 has a protection to the incident beam 6, it is desirable that the safety level 23 is determined based on the reference energy density 22 which is higher than a typical energy density when the safety can be determined to be "safe". Or, when the asset 3 has a protection which exceeds a predetermined light shielding condition to the incident beam 6, the safety may be unconditionally determined to be safe (the maximum safety level).

At step S103, when determined to be safe (when determined not to be dangerous), the safety checking apparatus 2 notifies that the asset 3 is in the safe condition, to the asset 3 or a unit (not shown) which controls the movement of the asset 3 (steps S104 No, S105). It is desirable that the notification of the "safe" condition is carried out to the beam irradiation apparatus 1 or the upper-layer system. Thus, the beam irradiation apparatus 1 or the upper-layer system can know whether the irradiation of the laser beam 5 became possible. Also, it is desirable that the notice indicative of safety is carried out by either of the broadcast, the communication, the sound, and the display.

At step S103, when determined to be dangerous, the safety checking apparatus 2 executes processing according to the determination result (steps S104: Yes, and S106). In detail, the safety checking apparatus 2 carries out a notification and a control according to the determined safety level. For example, the safety checking apparatus 2 notifies to the asset 3 or the unit (not shown) which controls the movement of the asset 3, that the asset 3 is in the "dangerous" condition. At this time, when knowing the direction when the asset 3 is determined to be safe, the safety checking apparatus 2 may notify the direction. Or, the safety checking apparatus 2 may notify to prompt the movement of the asset 3. Or, the safety checking apparatus 2 may output a control signal 200 to stop the irradiation of the laser beam 5 or to change the irradiation properties.

As mentioned above, in the beam irradiation system 100 of the first embodiment, an influence of the incident beam 6, especially, the scattered laser beam on the asset 3 is determined by calculating the energy density in the position or area of the asset 3 for every asset 3. Thus, the safety levels of the asset 3 which is located in a region out of the beam path of the laser beam 5 in addition to the asset 3 which is located in a region along the beam path of the laser beam 5 can be checked. Also, it is possible to issue a warning to the asset 3 determined to be dangerous to promote a movement and to stop the laser irradiation. Moreover, in the first embodiment, because the safety of the asset 3 can be checked in consideration of the influence of the incident beam 6 on the weak part, the movement limitation to the asset 3 can be reduced. For example, the stop of the laser irradiation and the unnecessary movement can be excluded because it is possible to ensure the safe condition by changing the orientation of the asset 3 determined to be dangerous.

[Second Embodiment]

Figure 7:
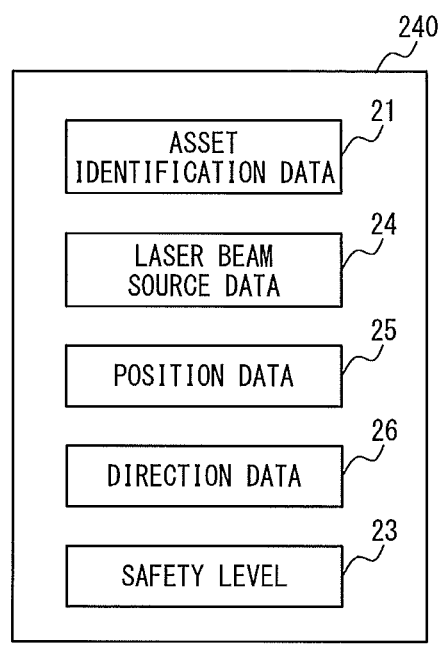
FIG. 7 is a diagram showing an example of the determination condition in a second embodiment.
Figure 8:
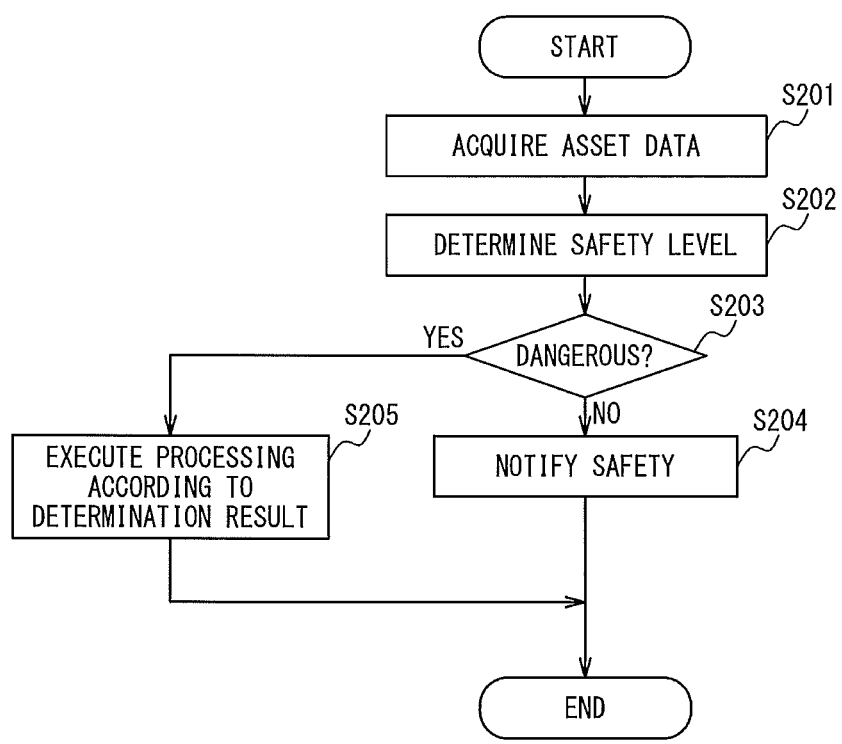
FIG. 8 is a flow diagram showing example of the operation of safety determination in the second embodiment.

Referring to FIG. 7 and FIG. 8, an operation of the beam irradiation system 100 according to a second embodiment will be described. FIG. 7 is a diagram showing an example of the determination condition 240 in the second embodiment. FIG. 8 is a flow diagram showing an example of the operation of the safety determination in the second embodiment. In the second embodiment, the safety of the asset 3 is determined based on whether or not the energy density of the incident beam 6 in the position or area of the asset 3 exceeds a threshold value set to the asset 3, like the first embodiment. In the first embodiment, the energy density of the incident beam 6 on the asset 3 is calculated based on the asset data 241, and the safety determination is carried out by using the calculation value. On the other hand, in the second embodiment, previously, the safety level for every asset in a predetermined position or area is prepared, and the safety determination is carried out by using the safety level.

Referring to FIG. 7, the determination condition 240 in the second embodiment is provided with the asset identification data 21, light source data 24, the position data 25, the direction data 26, and the safety level 23, which are related to each other. Because the asset identification data 21 and the safety level 23 are the same as those of the first embodiment, the description is omitted. The light source data 24 shows the irradiation properties of the laser beam 5, and contains data of the output power, the wavelength, the modulation method, the irradiation direction, the irradiation focus, and so on of the laser beam 5. When the properties of the laser beam 5 to be irradiated is previously determined, the light source data 24 may be an identifier which specifies the laser beam 5. The position data 25 contains data for specifying the position or area of the asset 3 to be arranged. For example, the data for specifying the position coordinates and a predetermined area is registered as the position data 25. Or, the position data 25 may contain a name of a position or area of the asset 3 (e.g. a room name). The direction data 26 contains data showing an orientation of the asset 3.

The determining section 20 in the second embodiment specifies the asset 3, the position or area of the asset 3, and the orientation of the asset 3 based on the asset data 241 shown in FIG. 5, and specifies the properties of the laser beam 5 to be irradiated, based on the beam data 242. The determining section 20 refers to the determination condition 240 to determine the safety level 23 corresponding to the position or area and orientation of the specified asset 3 and the properties of the laser beam 5.

Referring to FIG. 8, the details of the operation of the safety determination in the second embodiment will be described. Here, because the steps S201 and S203 to S205 are same as the steps S101 and S104 to 106 in the first embodiment, the detailed description is omitted.

The safety checking apparatus 2 specifies a kind of the asset 3, the position or area of the asset 3, and the weak part of the asset 3 by using the acquired asset data 241, and specifies the properties of the laser beam 5 to be irradiated from the beam data 242. Next, the safety checking apparatus 2 refers to the determination condition 240 to determine the safety level 23 of the asset 3 corresponding to the position or area of the specified asset 3, the orientation of the specified asset 3 and the properties of the laser beam 5 (step S202).

Processing according to the determined safety level is executed, like the steps S104 to S106 in the first embodiment (steps S203 to S205).

As described above, in the beam irradiation system 100 of the second embodiment, the influence of the incident beam 6, especially, the scattered laser beam on the asset 3 can be determined without calculating an energy density. Therefore, in the second embodiment, the safety of the asset 3 located in a region out of the beam path of the laser beam 5 can be checked in addition to the asset 3 located in a region along the beam path of the laser beam 5. Also, by issuing a warning to the asset 3 which has been determined to be dangerous, it is possible to promote a movement of the asset 3 and to stop the laser irradiation. Moreover, in the second embodiment, because the calculation of the energy density in the first embodiment can be omitted, the processing load of the safety checking apparatus 2 can be reduced, and the processing time to check the safety level can be reduced. Moreover, in the second embodiment, because the safety of the asset 3 can be checked in the consideration of the influence of the incident beam 6 on the weak part, the limitation of the movement to the asset 3 can be reduced. For example, by changing the orientation of the asset 3 determined to be dangerous, it is possible to determine to be safe. Therefore, the unnecessary movement and stop of the laser irradiation can be excluded.

[Third Embodiment]

Figure 9:
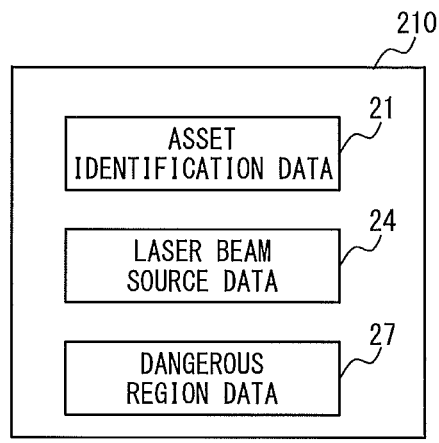
FIG. 9 is a diagram showing an example of the determination condition in a third embodiment.
Figure 10:
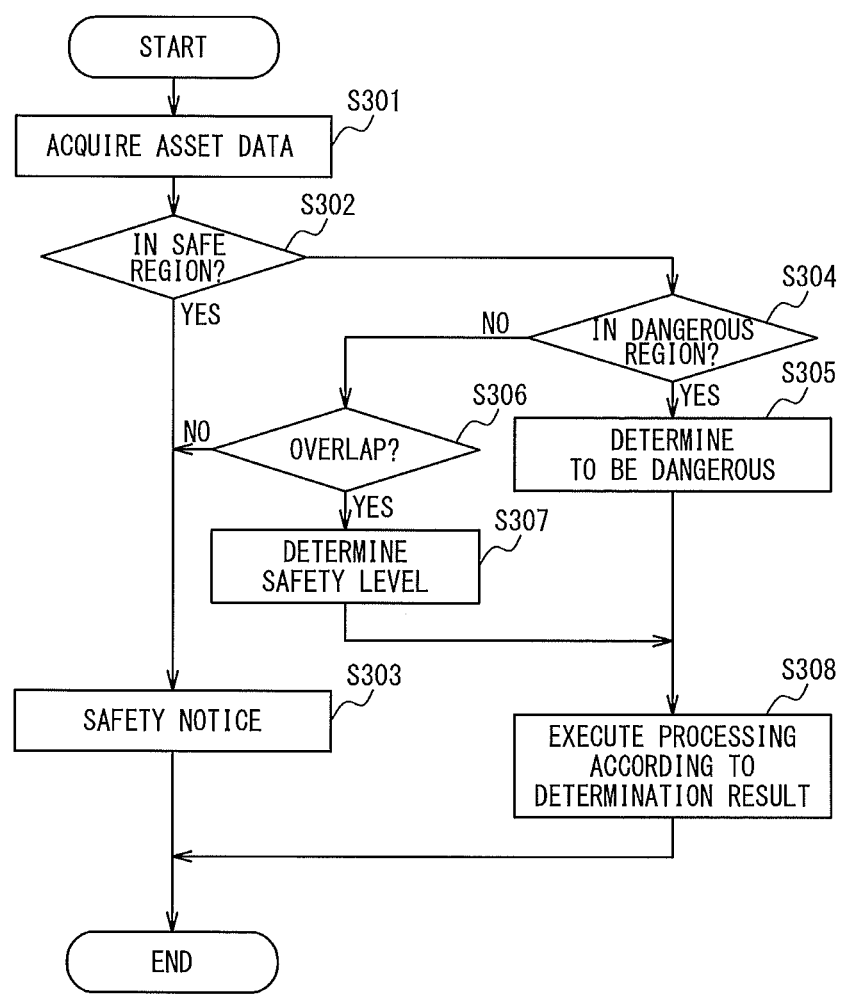
FIG. 10 is a flow diagram showing an example of the operation of safety determination in the third embodiment.
Figure 11:
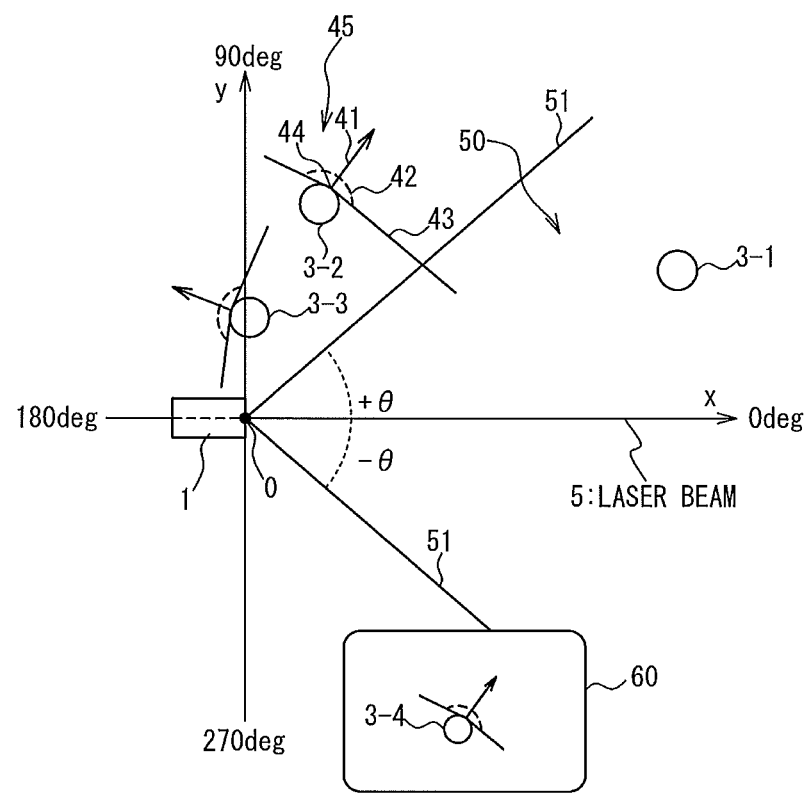
FIG. 11 is a conceptual diagram showing an example of a position and line-of-sight direction of a safety determination object in the third embodiment.
Figures 12, 13:
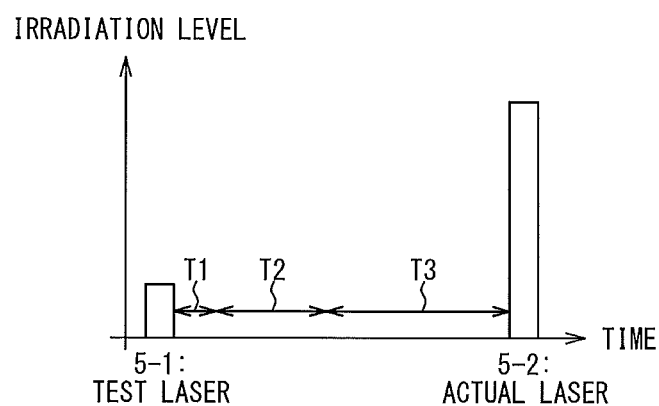
FIG. 12 is a diagram showing an example of a determination result of the safety determination operation in the third embodiment.
FIG. 13 is a diagram showing an example of laser irradiation timing in the safety determination operation in a fourth embodiment.

Referring to FIG. 9 to FIG. 12, an operation of the beam irradiation system 100 in a third embodiment will be described. FIG. 9 is a diagram showing an example of the determination condition 240 in the third embodiment. FIG. 10 is a flow diagram showing an example of an operation of the safety determination in the third embodiment. FIG. 11 is a conceptual diagram showing an example of a position or area of the safety determination object and a line-of-sight direction in the third embodiment. FIG. 12 is a diagram showing an example of the determination result of the safety determination in the third embodiment. In the third embodiment, the safety level of the asset 3 is determined based on the relation to a dangerous region, the position or area of the asset 3, and the weak region.

Referring to FIG. 9, the determination condition 240 in the third embodiment is provided with the asset identification data 21, the light source data 24, and dangerous region data 27, which are related to each other. Because the asset identification data 21 is same as that of the first embodiment, and the light source data 24 is same as that of the second embodiment. Thus, the description is omitted. The dangerous region data 27 contains data for specifying the dangerous region set for every asset according to the laser beam 5. For example, referring to FIG. 11, when the light axis of the laser beam 5 is X, the output position of the laser beam 5 is an origin O, a region defined by a predetermined angle on the x-y plane and a predetermined angle of elevation on the x-z plane from a start point O with respect to the X axis is set as a dangerous region 50. In the example shown in FIG. 11, for simplification of description, the dangerous region 50 is shown on the x-y plane 2-dimensionally. Here, the angle within +θ/−θ with respect to the light axis of the laser beam 5 (X axis) is set in the positive region on the X axis from the origin O as a start point, to define the dangerous region 50 by boundaries 51. In the third embodiment, the asset 3-1 in the dangerous region 50 is determined to be dangerous, irrespective of the weak region. However, when a protection to the weak part of the asset 3 is provided, the above is not always true.

The determining section 20 in the third embodiment determines the safety level of the asset 3 based on a relation of the dangerous region specified from the properties of the laser beam 5 to be irradiated, the position or area of the asset 3, and the weak part of the asset 3.

Referring to FIG. 10 to FIG. 12, the details of the operation of the safety determining in the third embodiment will be described. The safety checking apparatus 2 acquires the asset data, like the first embodiment (step S301). The safety checking apparatus 2 specifies the kind of the asset 3, the position or area of the asset 3, and the weak part of the asset 3 by using the acquired asset data 241, and specifies the properties of the laser beam 5 to be irradiated from the beam data 242.

First, the determining section 20 of the safety checking apparatus 2 determines whether or not the asset 3 is located in a safe region 60 (step S302). When the asset 3-4 is located in the safe region 60, the determining section 20 determines the asset 3 to be safe (step S302: Yes). For example, referring to FIG. 11 and FIG. 12, the asset 3-4 is determined to be "safe" without carrying out the determination of other types of safety, because the asset is located in the safe region 60. Note that it is desirable that the safety checking apparatus 2 holds data for specifying the safe region 60. Also, when the asset 3 has a protection to the incident beam 6 (for example, when wearing a protective suit such as an armor and a goggle), the asset 3 may be determined to be located in the safe region 60.

At step S302, when determined to be safe (when determined to be not dangerous), the safety checking apparatus 2 notifies to the asset 3 or the unit (not shown) which controls the movement of the asset 3, that the asset 3 is in the safe condition (steps S302: Yes, and S303). It is desirable that the notice of the safety of the asset is issued to the beam irradiation apparatus 1 or the upper-layer system. Thus, the beam irradiation apparatus 1 or the upper-layer system can know that the irradiation of the laser beam 5 became possible. Also, it is desirable that the notification of the safety is carried out by either of the broadcast, the communication, the sound, and the display.

At step S302, when the asset 3 is determined to be not located in the safe region 60, the safety checking apparatus 2 refers to the determination condition 240 to specify the dangerous region 50 corresponding to the specified asset 3-1 and the properties of the laser beam 5. Next, the determining section 20 determines whether or not the asset 3 is located in the dangerous region 50 (step S304). When the asset 3 is located in the dangerous region 50, the determining section 20 determines that the asset 3 is in the dangerous condition (the lowest safety level) (steps S304: Yes, and S305). For example, referring to FIG. 11 and FIG. 12, the asset 3-1 is determined to be dangerous without carrying out other types of safety determination, because the asset is located in the dangerous region 50.

At step S304, when determining the asset 3 to be not located in the dangerous region 50, the determining section 20 determines the safety level of the asset 3 from a relation of the position or area of the asset 3, the weak part of the asset 3, the weak region, and the dangerous region 50 (steps S304: No, and S306). In detail, referring to FIG. 11, the determining section 20 of the safety checking apparatus 2 sets a region prescribed by a predetermined range 42 (angle of view and angle of elevation) in relation to a region along the orientation 41 of a weak part 44 of the asset 3 (e.g. eyes) as an origin (i.e. a range of view), as the weak region 45. In the example shown in FIG. 11, a range of the angle of view 42 in a line-of-sight direction from the weak part 44 of the asset 3 as an origin is set by the boundaries 43 of the weak region 45. The determining section 20 determines the safety level of the asset 3 based on whether the weak region 45 and the dangerous region 50 overlap (intersect). For example, when the weak region 45 and the dangerous region 50 do not overlap (intersect), the determining section 20 determines to be "safe" (step S306: No), and when overlapping (intersecting), the determining section 20 determines to be "dangerous (not safe)" (step S306: Yes). For example, in FIG. 11 and FIG. 12, the asset 3-2 is determined to be "dangerous", because the weak region 45 and the dangerous region 50 overlap although the asset 3-2 is located out of the dangerous region 50. On the other hand, the asset 3-3 is determined to be "safe" because the asset 3-3 is located out of the dangerous region 50 and the weak region 45 and the dangerous region 50 do not overlap. Even if the asset 3 is located on the back side from the output position (origin O) of the laser beam 5, the asset is determined to be "dangerous (not safe)", when the weak region 45 and the dangerous region 50 overlap. Note that the weak region 45 may be set by the determining section 20 or be notified from the asset 3. Also, when the asset 3 has a protection to the incident beam 6, the weak region 45 may be set narrowly or determined to be no region. In this case, a range to which the asset 3 is determined to be dangerous becomes narrow. The degree of freedom of the asset 3 is increased.

Also, when the weak region 45 and the dangerous region 50 intersect, a different safety level is set according to an angle between the weak direction 41 and the boundary 51 of the dangerous region 50 (step S307). For example, when the weak region 45 and the dangerous region 50 intersect, and the weak direction 41 and the boundary 51 do not intersect, the asset is determined to be "cautious". When the weak direction 41 and the boundary 51 intersect, the asset is determined to be "dangerous", which is more dangerous than the "cautious" condition. Note that the step S307 may be omitted.

When determined to be "safe" at step S306, the processing advances to step S303. On the other hand, when determined to be any of the safety levels other than the "safe" level at steps S305 to S307 (e.g. "dangerous" and "cautious" levels), the processing according to the determination result is executed (step S308). In detail, the safety checking apparatus 2 carries out a notification and a control according to the determined safety level. For example, the safety checking apparatus 2 notifies to the asset 3 or the unit (not shown) which controls the movement of the asset 3, that the asset 3 is in the "dangerous" condition. When knowing a direction determined to be "safe", the safety checking apparatus 2 may notify the direction. Or, the safety checking apparatus 2 may notify to prompt the movement of the asset 3. Or, the safety checking apparatus 2 may output a control signal 200 to stop the irradiation of the laser beam 5 or to change the irradiation properties.

As described above, in the beam irradiation system 100 of the third embodiment, the influence of the incident beam 6, especially, the scattered laser beam on the asset 3 can be determined without calculating the energy density. Therefore, in the third embodiment, the safety of the asset 3 which is located in the region out of a beam path of the laser beam 5 can be checked in addition to the asset 3 located in the region along the beam path of the laser beam 5. Also, it is possible to output a warning to the asset 3 which has been determined to be "dangerous", so as to prompt the movement and to stop the laser irradiation. Moreover, in the third embodiment, because the calculation of the energy density in the first embodiment can be omitted, the processing load of the safety checking apparatus 2 can be reduced, and the processing time to check the safety can be reduced. Moreover, in the third embodiment, because the safety of the asset 3 can be checked in consideration of the influence of the incident beam 6 on the weak part, the limitation of the movement of the asset 3 can be reduced. For example, the stop of the laser irradiation and the unnecessary movement of the asset 3 can be eliminated because the asset can be determined to be "safe" by changing the orientation of the asset 3 which has been determined to be "dangerous".

[Fourth Embodiment]

Figure 14:
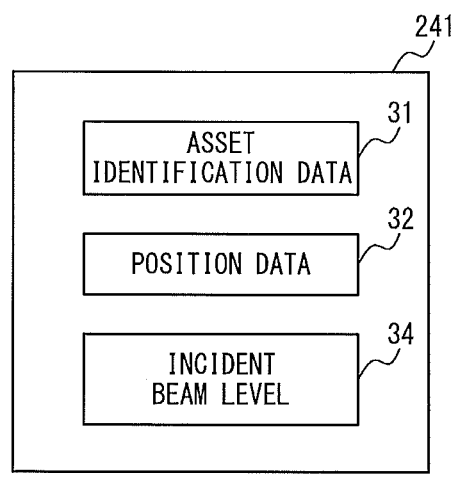
FIG. 14 is a diagram showing an example of the asset data in the fourth embodiment.

Referring to FIG. 13 to FIG. 15, an operation of the beam irradiation system 100 in a fourth embodiment will be described. FIG. 13 is a diagram showing an example of laser irradiation timings in the safety determination operation according to the fourth embodiment. FIG. 14 is a diagram showing an example of the asset data 241 in the fourth embodiment. FIG. 15 is a flow diagram showing an example of the operation of the safety determination in the fourth embodiment.

Referring to FIG. 13, in the fourth embodiment, a test laser beam 5-1 is irradiated before irradiation of an actual laser beam 5-2. Based on the measurement value of energy density of scattered laser beams or reflected laser beams from the test laser beam 5-1, the energy density of the scattered laser beams or the reflected laser beams from the actual laser beam 5-2 are predicted or estimated, and the safety of the asset 3 is predicted or estimated by using the estimation. After the elapse of a scattered beam reaching time T1, a safety determination time T2, and a processing time T3 executed according to the determination result from the irradiation of the test laser beam 5-1, the actual laser beam 5-2 is irradiated.

In the fourth embodiment, the determination condition 240 like the first embodiment and the determination condition 240 like the second embodiment are used, and the asset data 241 like the second embodiment is used.

Referring to FIG. 15, the safety checking apparatus 2 acquires the asset data shown in FIG. 5 (step S401). The safety checking apparatus 2 specifies the kind of the asset 3, the position or area of the asset 3, and the weak part of the asset 3 by using the acquired asset data 241 and specifies the properties of the laser beam 5 to be irradiated from the beam data 242. At this time, it is desirable to specify the properties of the test laser beam 5-1 and the actual laser beam 5-2.

First, the determining section 20 of the safety checking apparatus 2 determines whether or not the asset 3 is safe to the test laser beam 5-1 (step S402). In detail, the determining section 20 determines whether the asset 3 is located in the dangerous region 50 or a region along the light axis of the test laser beam 5-1. In this case, when the asset 3 is located in the dangerous region 50 or in the region along the light axis of the test laser beam 5-1, the asset 3 is determined to be dangerous, and the processing according to the determination result is executed (steps S403: Yes, and S404). For example, the safety checking apparatus 2 notifies to the asset 3 or the unit (not shown) which controls the movement of the asset 3, that the asset 3 is in a dangerous condition. At this time, when an orientation is known in which the asset 3 is determined to be safe, the safety checking apparatus 2 may notify the orientation. Or, the safety checking apparatus 2 may issue a notice to prompt the movement of the asset 3. Or, the safety checking apparatus 2 may output a control signal 200 to stop the irradiation of the test laser beam 5-1 or to change the irradiation properties. It is desirable that the dangerous region 50 is set according to the properties of the test laser beam 5-1. Also, when it is known that the test laser beam 5-1 is in a safe level to the asset 3, the safety level determination (steps S402 to S404) to the test laser beam 5-1 may be omitted.

When determined to be safe (not dangerous) at step S403, the safety checking apparatus 2 irradiates the test laser beam 5-1 (steps S403: No, and S405). To suppress the influence on the asset 3, the output of the test laser beam 5-1 is set lower than that of the actual laser beam 5-2, and either of laser classes 1-3 (JIS standard) is selected appropriately. Also, there are a case where the test laser beam 5-1 is irradiated plural times, and a case where the test laser beam 5-1 is irradiated in parallel to another laser beam emitted from another unit. In such cases, to facilitate the measurement of the test laser beam 5-1, and to improve the measurement precision, it is desirable to set the test laser beam 5-1 and the other laser beam distinguishable from each other. Here, it is desirable to change the properties of beam so that the scatter characteristics of the test laser beam 5-1 and the actual laser beam 5-2 are not changed largely. When the test laser beam 5-1 is irradiated, the asset 3 measures the energy density of the incident beam 6 which is incident on the asset 3 according to the test laser beam 5-1. In this case, if the energy density in the area where the asset 3 is located can be measured, the energy density of the incident beam 6 according to the test laser beam 5-1 may be measured by the unit (not shown) different from the asset 3.

The safety checking apparatus 2 acquires the asset data 241 shown in FIG. 14 from the asset 3 after the irradiation of the test laser beam 5-1 (step S406). The asset data 241 in the present embodiment contains a measurement value (incident beam level 34) of the energy density of the incident beam 6 from the test laser beam 5-1 in the position or area of the asset 3, together with the asset identification data 31, and the position data 32 of the asset 3. The incident beam level 34 is the energy density of the incident beam 6 measured in the asset 3 or in a predetermined area where the asset 3 is located, when the test laser beam 5-1 is irradiated.

The determining section 20 of the safety checking apparatus 2 refers to the determination condition 240 shown in FIG. 4 to determine the safety level of the asset 3 based on the acquired asset data 241 (step S407). Here, the determining section 20 calculates an estimation of the energy density of the actual laser beam 5-2 from the measured value of the energy density under the consideration of an output ratio of the test laser beam 5-1 and the actual laser beam 5-2 and the difference in the properties of beam. Next, the determining section 20 determines the safety level 23 of asset 3 based on the reference energy density 22 and the estimation. Also, at step S405, when the energy density over the circumference of the asset 3 is measured, the safety level over the circumference may be determined by the similar method. However, it is desirable that the safety level is determined for the estimation calculated from the maximum energy density of the measured values. Or, at step S405, when the energy density from the weak direction of the asset 3 is measured, it is desirable that the safety level in the weak direction is determined based on (the estimation calculated from) the measured energy density. Moreover, when the asset 3 has any protection to the incident beam 6, it is desirable that the safety level 23 is determined based on a lower reference energy density 22. Or, when the asset 3 has the protection which exceeds a predetermined light shielding condition to incident beam 6, the safety level may be unconditionally determined to be safe (the maximum safety level).

At step S407, when determined to be safe (when determined to be not dangerous), the safety checking apparatus 2 notifies that the asset 3 is in the safe condition, to the asset 3 or the unit (not shown) which controls the movement of the asset 3 (steps S408: No, and S409). It is desirable that a notice of the asset in the safety condition is transmitted to the beam irradiation apparatus 1 or an upper-layer system. Thus, the beam irradiation apparatus 1 or the upper-layer system can know that the irradiation of the test laser beam 5-1 is possible. Also, it is desirable that the notification of the safety is carried out by either of the broadcast, the communication, the sound, and the display.

When determined to be dangerous at step S407, the safety checking apparatus 2 executes processing according to the determination result (steps S408: Yes, and S410). In detail, the safety checking apparatus 2 carries out the transmission of the notice and the control according to the determined safety level. For example, the safety checking apparatus 2 notifies that the asset 3 is in the dangerous condition, to the asset or the unit (not shown) which controls the movement of the asset 3. At this time, when knowing the orientation when the asset is determined to be safe, the safety checking apparatus 2 may notify the orientation. Or, the safety checking apparatus 2 may notify to prompt the movement of the asset 3. Or, the safety checking apparatus 2 may stop the irradiation of the test laser beam 5-1 or output the control signal 200 to change the irradiation properties.

As mentioned above, in the beam irradiation system 100 in the fourth embodiment, after checking the safety by the test laser beam 5-1 before irradiating the actual laser beam 5-2, the actual laser beam 5-2 of a high power (laser class 4) can be outputted. In the above-mentioned example, the test laser beam 5-1 is irradiated only once. However, the present invention is not limited to the above example, and the test laser beam 5-1 may be irradiated plural times to ensure the safety of the assets 3. That is, by repeating the processing of the steps S405 to S410, the safety may be ensured. Also, when irradiating the test laser beam 5-1 plural times, the output power of the test laser beam 5-1 may be changed every time the irradiation repeated. Moreover, the processing of measuring and estimating the energy density of the actual laser beam 5-2 from the measured values may be omitted, and the irradiation of the test laser beam 5-1 and the safety determination may be repeated while the output power of the test laser beam is increased, to determine the output power of the actual laser beam 5-2 (steps S405 to S407). In this case, it is desirable that the actual laser beam 5-2 is irradiated with the irradiation properties when all the assets are determined not to be dangerous (for example, all the assets are determined to be in a level equal to or safer than the cautious level).

In the beam irradiation system 100 of the fourth embodiment, the influence of the incident beam 6, especially, the scattered laser beam on the assets 3 is determined by measuring the energy density in the position or area of the asset 3 for every asset 3. Thus, the safety of the asset 3 located in a region out of the beam path can be checked in addition to the asset located in a region along the beam path of the laser beam 5. Also, it is possible to transmit a warning to the asset 3 to have been determined to be dangerous to promote a movement of the asset 3, and to stop the laser irradiation. Moreover, in the fourth embodiment, because the safety of the asset 3 can be checked in consideration of the influence of the incident beam 6 on the weak part of the asset 3, the limitation of the movement of the asset 3 can be reduced. For example, because it is possible to ensure the safety condition by changing the orientation of the asset 3 that has been determined to be dangerous, the unnecessary movement and the stop of laser irradiation can be avoided. Also, a calculation cost for the calculation of the energy density of the scattered laser beam or the reflected laser beam from the laser beam 5 can be reduced by carrying out the safety determination by using the measurement data.

In above, the embodiments of the present invention have been described in detail. However, the specific configuration is not limited to the above embodiments. Various modifications and changes in a range which does not deviate from the features of the present invention are contained in the present invention. The above-mentioned embodiments can be combined in a range of no technical contradiction. In the above-mentioned embodiments, the scattered laser beam and the reflected laser beam are used as the incident beam 6 for the safety determination. However, the laser beam 5 itself may be used as the incident laser beam.

What is claimed is:

1. A safety checking apparatus comprising:
a determining section configured to determine a safety level of an asset for an incident beam related to an irradiation beam based on a position or area where the asset is located and an irradiation direction of the irradiation beam; and
a result data control section configured to transmit a notice to the asset based on a determination result of the safety level by the determining section,
wherein the determining section determines the safety level of the asset by comparing an energy density of the incident beam to the asset and a reference energy density registered as a determination condition, and
wherein the determining section calculates the energy density of the incident beam to the asset based on the position or area of the asset, the irradiation direction of the irradiation beam, a weak region of the asset, and an output power of the irradiation beam, and determines the safety level of the asset based on the comparison result of the calculated energy density and the reference energy density registered as the determination condition.

2. A safety checking apparatus comprising:
a determining section configured to determine a safety level of an asset for an incident beam related to an irradiation beam based on a position or area where the asset is located and an irradiation direction of the irradiation beam; and
a result data control section configured to transmit a notice to the asset based on a determination result of the safety level by the determining section,
wherein the determining section determines the safety level of the asset by comparing an energy density of the incident beam to the asset and a reference energy density registered as a determination condition, and
wherein the determining section calculates the energy density of the incident beam related to the irradiation beam based on a measured value of the energy density of the incident beam to the asset which is related to a test irradiation beam irradiated previously to the irradiation beam, and determines the safety level of the asset based on a comparison result of the calculated energy density and the reference energy density.

3. A safety checking apparatus comprising:
a determining section configured to determine a safety level of an asset for an incident beam related to an irradiation beam based on a position or area where the asset is located and an irradiation direction of the irradiation beam; and
a result data control section configured to transmit a notice to the asset based on a determination result of the safety level by the determining section,
wherein the determining section determines the safety level of the asset based on whether an incident direction of the incident beam to the asset is from a direction in a weak region of the asset, and
wherein the determining section determines the safety level of the asset for the incident beam to the asset based on a position relation between the weak region of the asset which is set based on a weak part of the asset, and a dangerous region which is set based on the output power of the irradiation beam and the irradiation direction of the irradiation beam.

4. The safety checking apparatus according to claim 3, wherein the determining section determines the asset to be dangerous, when the weak region of the asset and the dangerous region overlap each other.

5. A beam irradiation system comprising:
a beam irradiation apparatus configured to irradiate an irradiation beam; and
a safety checking apparatus which comprises:
a determining section configured to determine a safety level of an asset for an incident beam related to the irradiation beam based on a position or area of the asset and an irradiation direction of the irradiation beam; and
a result data control section configured to transmit a notice to the asset based on a determination result of the safety level by the determining section,
wherein the determining section determines the safety level of the asset by comparing an energy density of the incident beam to the asset and a reference energy density registered as a determination condition, and
wherein the determining section calculates the energy density of the incident beam to the asset based on the position or area of the asset, the irradiation direction of the irradiation beam, a weak region of the asset, and an output power of the irradiation beam, and determines the safety level of the asset based on the comparison result of the calculated energy density and the reference energy density registered as the determination condition.

6. The beam irradiation system according to claim 5, wherein the safety checking apparatus outputs a control signal to the beam irradiation apparatus to change properties of the irradiation beam, when determining the asset to be dangerous, and
wherein the beam irradiation apparatus changes the properties of the irradiation beam in response to the control signal.

7. The beam irradiation system according to claim 5, wherein the safety checking apparatus outputs a control signal to the beam irradiation apparatus to stop the irradiation of the irradiation beam, when determining the asset to be dangerous, and
wherein the beam irradiation apparatus stops the irradiation of the irradiation beam in response to the control signal.

8. A safety checking method comprising:
determining a safety level of an asset for an incident beam related to an irradiation beam based on a position or area of the asset and an irradiation direction of the irradiation beam; and
transmitting a notice to the asset based on a determination result of the safety level,
wherein the determining comprises determining the safety level of the asset by comparing an energy density of the incident beam to the asset and a reference energy density registered as a determination condition, and
wherein the determining comprises:
calculating the energy density of the incident beam to the asset based on the position or area of the asset, the irradiation direction of the irradiation beam, a weak region of the asset, and an output power of the irradiation beam; and
determining the safety level of the asset based on the comparison result of the calculated energy density and the reference energy density registered as the determination condition.

9. A The safety checking method comprising:
determining a safety level of an asset for an incident beam related to an irradiation beam based on a position or area of the asset and an irradiation direction of the irradiation beam; and
transmitting a notice to the asset based on a determination result of the safety level,
wherein the determining comprises determining the safety level of the asset by comparing an energy density of the incident beam to the asset and a reference energy density registered as a determination condition, and
wherein the determining comprises:
calculating the energy density of the incident beam related to the irradiation beam based on a measured value of the energy density of the incident beam to the asset which is related to a test irradiation beam irradiated previously to the irradiation beam; and
determining the safety level of the asset based on a comparison result of the calculated energy density and the reference energy density.

10. A safety checking method comprising:
determining a safety level of an asset for an incident beam related to an irradiation beam based on a position or area of the asset and an irradiation direction of the irradiation beam; and
transmitting a notice to the asset based on a determination result of the safety level,
wherein the determining comprises determining the safety level of the asset based on whether an incident direction of the incident beam to the asset is from a direction in a weak region of the asset, and
wherein the determining comprises determining the safety level of the asset for the incident beam to the asset based on a position relation between the weak region of the asset which is set based on a weak part of the asset, and a dangerous region which is set based on the output power of the irradiation beam and the irradiation direction of the irradiation beam.

11. The safety checking method according to claim 10, wherein the determining comprises determining the asset to be dangerous, when the weak region of the asset and the dangerous region overlap each other.

12. A non-transitory computer-readable storage medium which stores a safety checking program, by executing by a computer, to realize functions of:
determining a safety level of an asset for an incident beam related to an irradiation beam based on a position or area of the asset and an irradiation direction of the irradiation beam; and
transmitting a notice to the asset based on a determination result of the safety level,
wherein the determining comprises determining the safety level of the asset by comparing an energy density of the incident beam to the asset and a reference energy density registered as a determination condition, and
wherein the determining comprises:
calculating the energy density of the incident beam to the asset based on the position or area of the asset, the irradiation direction of the irradiation beam, a weak region of the asset, and an output power of the irradiation beam; and
determining the safety level of the asset based on the comparison result of the calculated energy density and the reference energy density registered as the determination condition.

13. A beam irradiation system comprising:
a beam irradiation apparatus configured to irradiate an irradiation beam; and a safety checking apparatus which comprises:
- a determining section configured to determine a safety level of an asset for an incident beam related to the irradiation beam based on a position or area of the asset and an irradiation direction of the irradiation beam; and
- a result data control section configured to transmit a notice to the asset based on a determination result of the safety level by the determining section, wherein the determining section determines the safety level of the asset by comparing an energy density of the incident beam to the asset and a reference energy density registered as a determination condition, and wherein the determining section calculates the energy density of the incident beam related to the irradiation beam based on a measured value of the energy density of the incident beam to the asset which is related to a test irradiation beam irradiated previously to the irradiation beam, and determines the safety level of the asset based on a comparison result of the calculated energy density and the reference energy density.

14. The beam irradiation system according to claim 13, wherein the safety checking apparatus outputs a control signal to the beam irradiation apparatus to change properties of the irradiation beam, when determining the asset to be dangerous, and
- wherein the beam irradiation apparatus changes the properties of the irradiation beam in response to the control signal.

15. The beam irradiation system according to claim 13, wherein the safety checking apparatus outputs a control signal to the beam irradiation apparatus to stop the irradiation of the irradiation beam, when determining the asset to be dangerous, and
- wherein the beam irradiation apparatus stops the irradiation of the irradiation beam in response to the control signal.

16. A beam irradiation system comprising:
- a beam irradiation apparatus configured to irradiate an irradiation beam; and
- a safety checking apparatus which comprises:
  - a determining section configured to determine a safety level of an asset for an incident beam related to the irradiation beam based on a position or area of the asset and an irradiation direction of the irradiation beam; and
  - a result data control section configured to transmit a notice to the asset based on a determination result of the safety level by the determining section, wherein the determining section determines the safety level of the asset based on whether an incident direction of the incident beam to the asset is from a direction in a weak region of the asset, and wherein the determining section determines the safety level of the asset for the incident beam to the asset based on a position relation between the weak region of the asset which is set based on a weak part of the asset, and a dangerous region which is set based on the output power of the irradiation beam and the irradiation direction of the irradiation beam.

17. The beam irradiation system according to claim 16, wherein the safety checking apparatus outputs a control signal to the beam irradiation apparatus to change properties of the irradiation beam, when determining the asset to be dangerous, and
- wherein the beam irradiation apparatus changes the properties of the irradiation beam in response to the control signal.

18. The beam irradiation system according to claim 16, wherein the safety checking apparatus outputs a control signal to the beam irradiation apparatus to stop the irradiation of the irradiation beam, when determining the asset to be dangerous, and
- wherein the beam irradiation apparatus stops the irradiation of the irradiation beam in response to the control signal.

* * * * *